United States Patent [19]

Raynes

[11] 4,227,778
[45] Oct. 14, 1980

[54] LIQUID CRYSTAL MATERIAL MIXTURES AND DEVICES INCORPORATING SUCH MIXTURES

[75] Inventor: Edward P. Raynes, Malvern, England

[73] Assignee: The Secretary of State for Defence in Her Britannic Majesty's Government of the United Kingdom of Great Britain and Northern Ireland, London, England

[21] Appl. No.: 955,751

[22] Filed: Oct. 30, 1978

[30] Foreign Application Priority Data

Nov. 2, 1977 [GB] United Kingdom ............... 45627/77

[51] Int. Cl.$^3$ ........................... G02F 1/13; C09K 3/34
[52] U.S. Cl. ................................ 350/350 R; 252/299; 252/408
[58] Field of Search ................ 350/346, 350; 252/299, 252/408

[56] References Cited

U.S. PATENT DOCUMENTS

| | | | |
|---|---|---|---|
| 3,947,375 | 3/1976 | Gray et al. | 252/299 |
| 3,974,087 | 8/1976 | Gray et al. | 252/299 |
| 4,035,056 | 7/1977 | Coates et al. | 252/299 |
| 4,069,167 | 1/1978 | Inukai et al. | 252/299 |
| 4,077,260 | 3/1978 | Gray et al. | 252/299 |
| 4,113,647 | 9/1978 | Coates et al. | 252/299 |
| 4,119,558 | 10/1978 | Coates et al. | 252/299 |
| 4,120,567 | 10/1978 | Goodman et al. | 252/299 |
| 4,137,192 | 1/1979 | Matsufuji | 252/299 |
| 4,147,651 | 4/1979 | Oh | 252/299 |
| 4,149,413 | 4/1979 | Gray et al. | 252/299 |

FOREIGN PATENT DOCUMENTS

| | | | |
|---|---|---|---|
| 105701 | 5/1974 | German Democratic Rep. | 252/299 |
| 132591 | 10/1978 | German Democratic Rep. | 252/299 |
| 1452826 | 10/1976 | United Kingdom | 252/299 |
| 1456359 | 11/1976 | United Kingdom | 252/299 |
| 1507060 | 4/1978 | United Kingdom | 252/299 |
| 1510360 | 5/1978 | United Kingdom | 252/299 |
| 1519536 | 8/1978 | United Kingdom | 252/299 |
| 1527727 | 10/1978 | United Kingdom | 252/299 |

OTHER PUBLICATIONS

Coates, D., et al., Mol. Cryst. Liq. Cryst., vol. 31, pp. 275-283, (1975).
Gray, G., et al., Electronics Letters, vol. 11, No. 23, pp. 556-557, (1975).
Gray, G., et al., Electronics Letters, vol. 9, No. 26, pp. 616-617, (1973).

*Primary Examiner*—Teddy S. Gron
*Attorney, Agent, or Firm*—Stevens, Davis, Miller & Mosher

[57] ABSTRACT

A liquid crystal material mixture for use in liquid crystal displays is arranged to have a small display threshold voltage change with temperature over a desired operating range, e.g. 0° to 40° C. This is obtained by a mixture of at least one liquid crystal material of type A and at least one liquid crystal material of a type B; wherein type A has the following phases with increasing temperature:

crystal   working phase   isotropic;

type B has the following phases with increasing temperature;

crystal   working phase   smectic   working phase   isotropic;

and the working phase is nematic or cholesteric.

The resulting mixture has only one phase, the working phase, between crystalline and isotropic phases but has a lower threshold voltage change with temperature characteristic than a type A material alone.

11 Claims, 9 Drawing Figures

LIQUID CRYSTAL MATERIAL MIXTURES AND DEVICES INCORPORATING SUCH MIXTURES

This invention relates to liquid crystal material mixtures and devices incorporating such mixtures.

Liquid crystal materials can adopt three known liquid crystal phases between the solid crystal state and the isotropic state. These phases are smectic, cholesteric, and nematic, each having a distinctive molecular arrangement. On heating, some liquid crystal materials change from one to another others adopt only one phase between a crystal and isotropic condition.

For example with rising temperature a material may show:

crystal⇌nematic (or cholesteric)⇌isotropic
or crystal⇌smectic⇌nematic⇌isotropic
or crystal⇌nematic⇌smectic⇌nematic⇌isotropic
or crystal⇌smectic⇌cholesteric⇌isotropic.

Usually a material or mixture of materials is chosen so that over a normal operating temperature range the material remains at one phase e.g. nematic. An exception to this is described in U.K. patent application No. 49,285/76 where the mixture is arranged to have a smectic to cholesteric phase transition just below the operating temperature of a phase change display to reduce the change in threshold voltage (described later) over the operating temperature range.

Liquid crystal devices commonly comprise a thin layer of a liquid crystal material sandwiched between two glass substrates. These substrates carry electrodes on their inner face so that an electric field can be applied across the liquid crystal layer to cause a change in its optical property e.g. change from optically active to optically inactive.

A common feature of liquid crystal devices is that they change their molecular alignment on application of a voltage above a critical voltage level $V_c$. For a given liquid crystal $V_c$ varies with temperature and it is desirable that this variation is as small as possible over the range of operating temperature e.g. 0° to 40° for a liquid crystal multiplexed twisted nematic display such as used in a calculator.

According to this invention a liquid crystal material mixture for use in liquid crystal displays includes at least one material of type A and at least one material of type B selected so that the resultant mixture has only one liquid crystal phase between crystal and isotropic states with only a small change in threshold voltage over a desired operating temperature range, wherein type A has the following phases with increasing temperature crystal    working phase    isotropic, type B has the following phases with increasing temperature crystal    working phase    smectic    working phase    isotropic, and the working phase is nematic or cholesteric.

Type B may be produced from a mixture of type A and a type C which has the following phases crystal    smectic    working phase    isotropic.

Type A and C may be single or multi-component mixtures.

The invention will now be described by way of example only with reference to the accompanying drawings of which:

Figure 1:
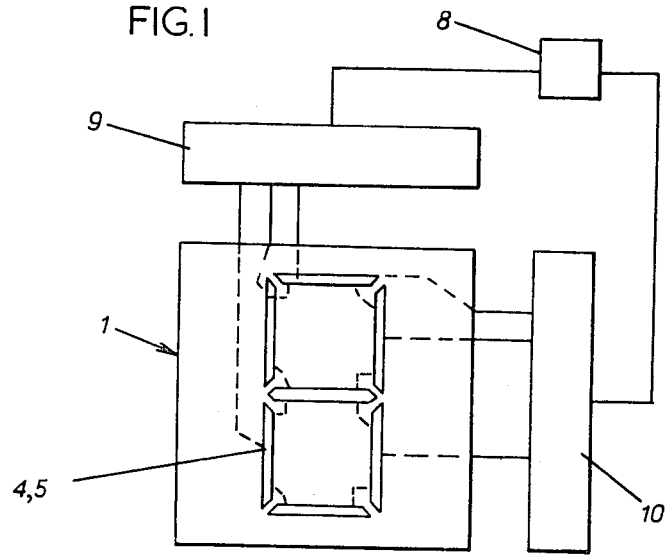
FIGS. 1, 2 are front and section view respectively of a liquid crystal display.
Figure 2:
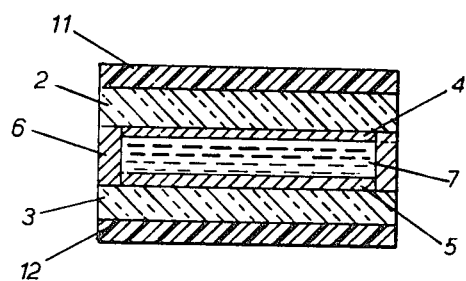

FIGS. 1, 2 show a liquid crystal display cell 1 comprising two glass slides 2, 3 each having an electrode pattern 4, 5 on their inner face in the form of a seven bar numeric display. A spacer ring 6 maintains the slides 2, 3 about 12 μm apart. Between the slides 2, 3 is a liquid crystal mixture 7. Electric potentials are applied to the electrodes 4, 5 from a voltage source 8 through switching logic 9, 10.

Prior to assembly the slides 2, 3 are unidirectionally rubbed, e.g. with a tissue cloth, and the rubbing directions arranged orthogonally. This aligns the liquid crystal molecules to give a progressive 90° twist between the slides 2, 3. Other alignment methods may be used e.g. oblique evaporation of SiO as described in U.K. Pat. Nos. (U.S. Pat. No. 4,084,894) 1,472,247 and 1,478,592 U.K. patent application No. 34,678/76. The slides are placed between crossed (or parallel) polarisers 11, 12. Such an arrangement is often termed a twisted nematic display.

With zero volts applied to the twisted nematic display light is transmitted through the cell 1 with the liquid crystal 7 rotating the plane of polarisation of light passing through it i.e. the layer 7 is in an OFF state and the display transmits light (or blocks light with parallel polarisers). When the display is observed at normal incidence to the plane of the cell the lowest voltage that causes an observable effect may be termed a critical voltage $V_c$ and the voltage that causes 90% extinction (using crossed polarisers or 10% transmission using parallel polarisers) i.e. the ON state may be termed a saturation voltage $V_{sat}$. Normally an operating voltage of about 3 $V_c$ (slightly less for multiplexed displays) is used to turn a cell ON since this produces a faster turn ON time and a better angle of view to a display.

These voltages $V_c$, $V_{sat}$ vary with temperature and therefore make it difficult to multiplex address matrix liquid liquid crystal displays over a temperature range. Such displays may have electrodes arranged in lines and columns or in numeric form (e.g. seven bar configuration) and addressed in a multiplexed manner. The larger or more complex the display the more critical it is to maintain a correct driving voltage. Since $V_c$ varies with temperature the size of the matrix display must be limited or the usable temperature range must be limited for a given liquid crystal material.

Figure 3:
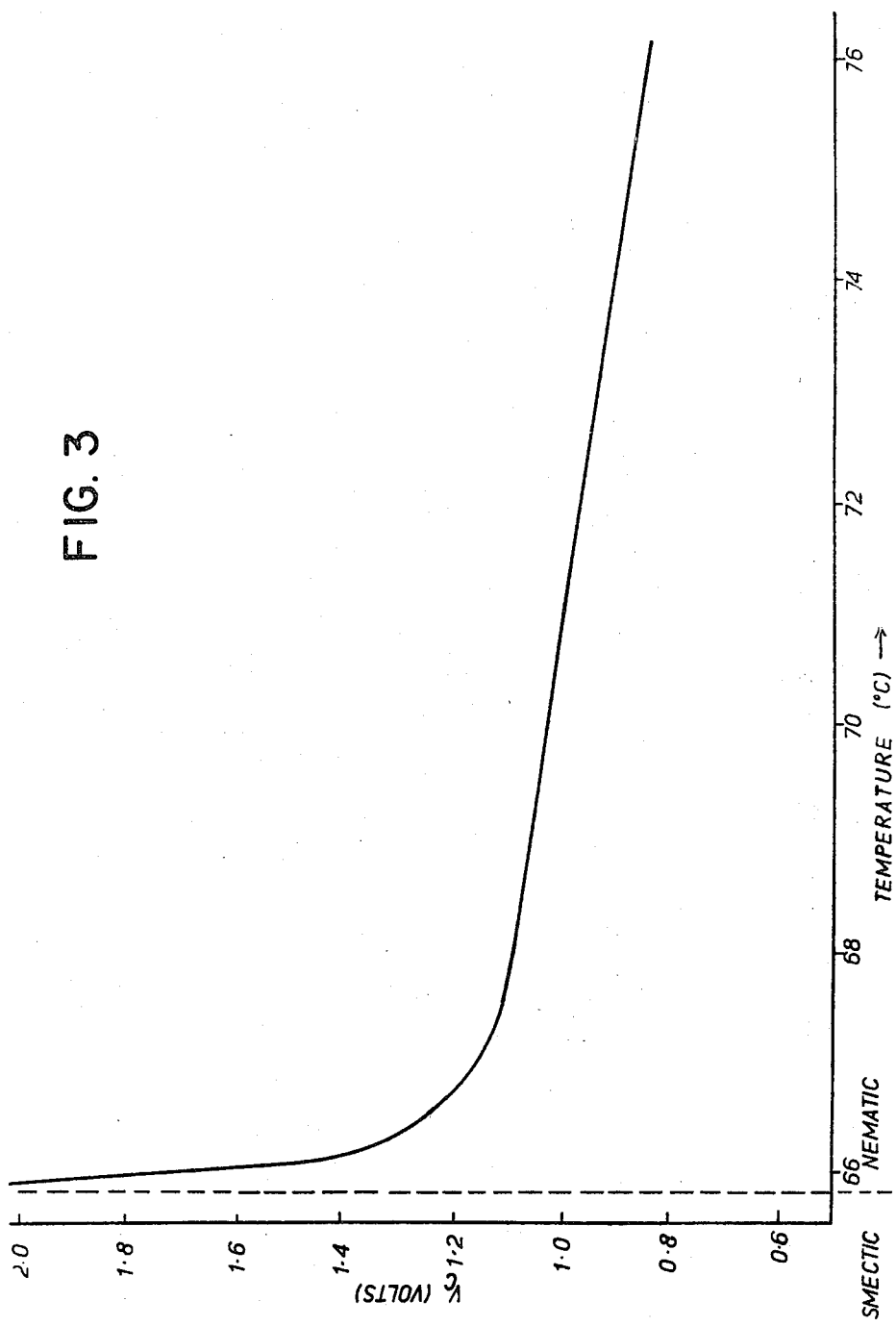
FIGS. 3, 4 and 5 are graphs of threshold voltage vs. temperature for three types of liquid crystal material.

The way in which threshold voltage varies with temperature for a twisted nematic device with a material of type C is shown in FIG. 3. As the temperature is lowered below about 67° C. the threshold voltage rises rapidly towards infinity. Thus the useful operating temperature range is about 67°-78° C. for a typical display. Below about 65.8° C. the material becomes smectic.

Figure 4:
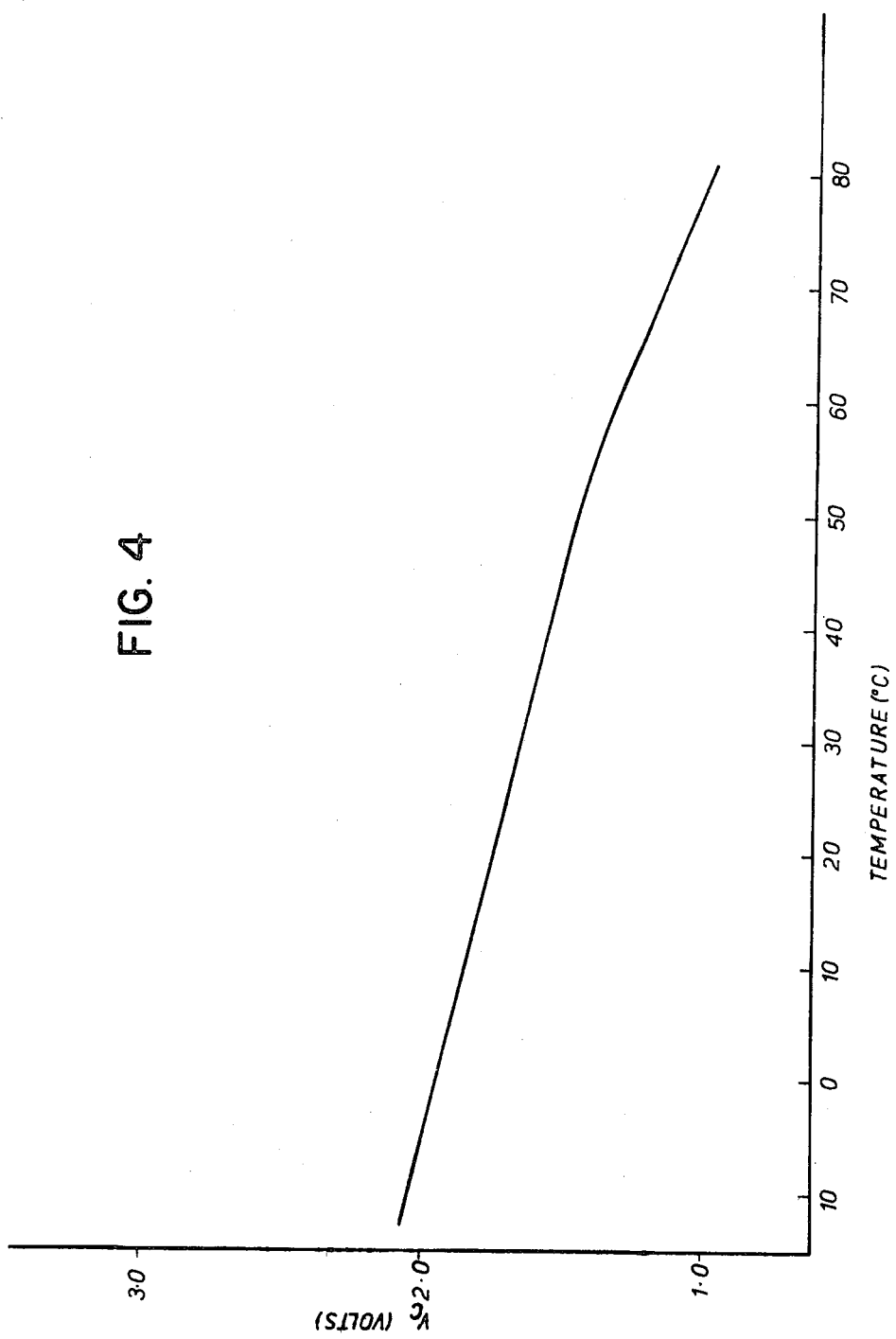

FIG. 4 shows how $V_c$ varies with temperature for a material of type A.

Figure 5:
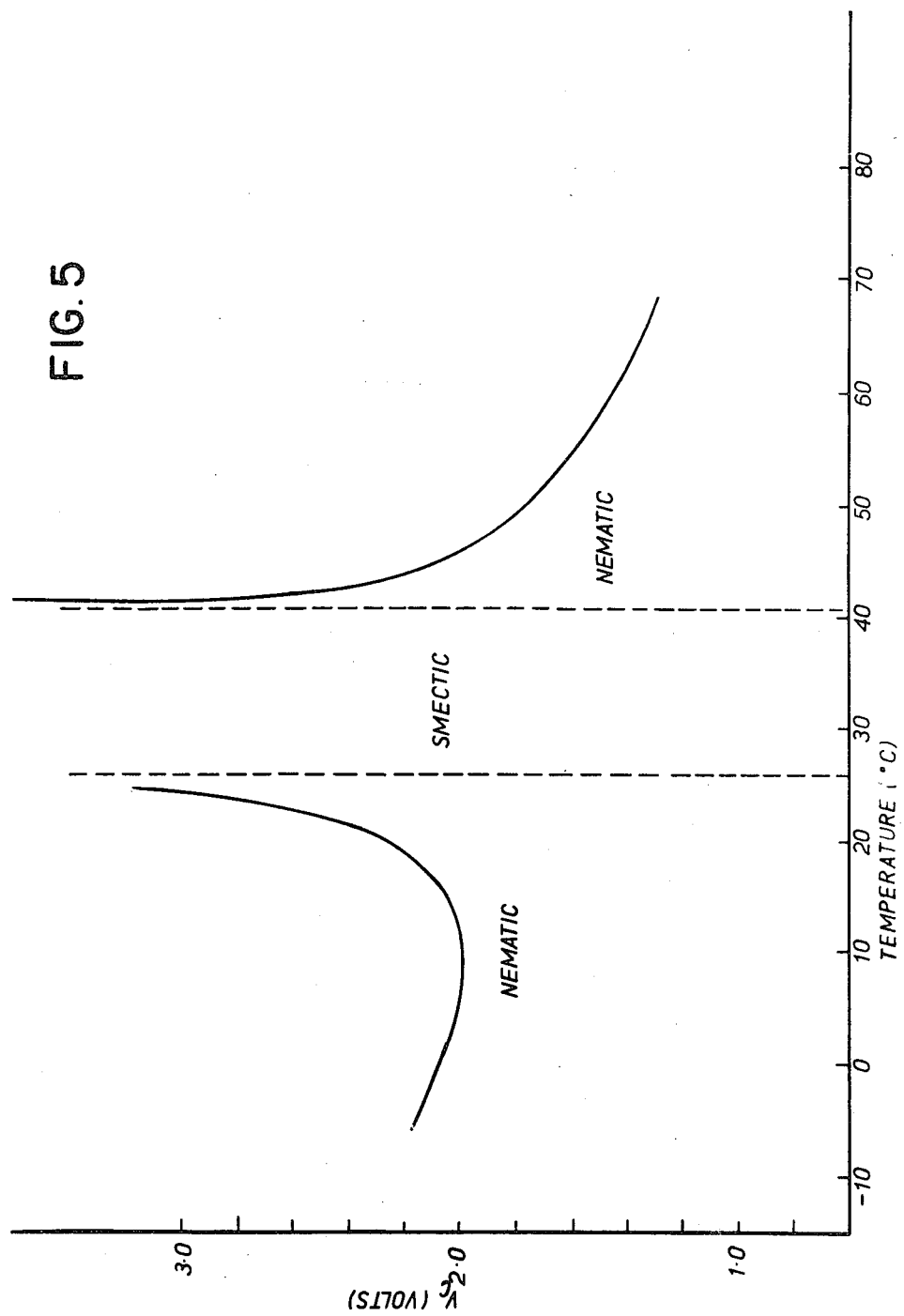

FIG. 5 shows how $V_c$ varies with temperature for a material of type B. Below about 26° C. and above about 41° C. the material is nematic whilst between these temperatures the material is smectic.

One indication of the constancy of $V_c$ is the value of $\Delta V_c/V_c$ where $\Delta V_c$ is change in $V_c$ over a temperature range. A low value of $\Delta V_c/V_c$ may be defined as below 0.2 volts. Preferably $\Delta V_c/V_c$ is below 0.1 volts.

Figure 6:
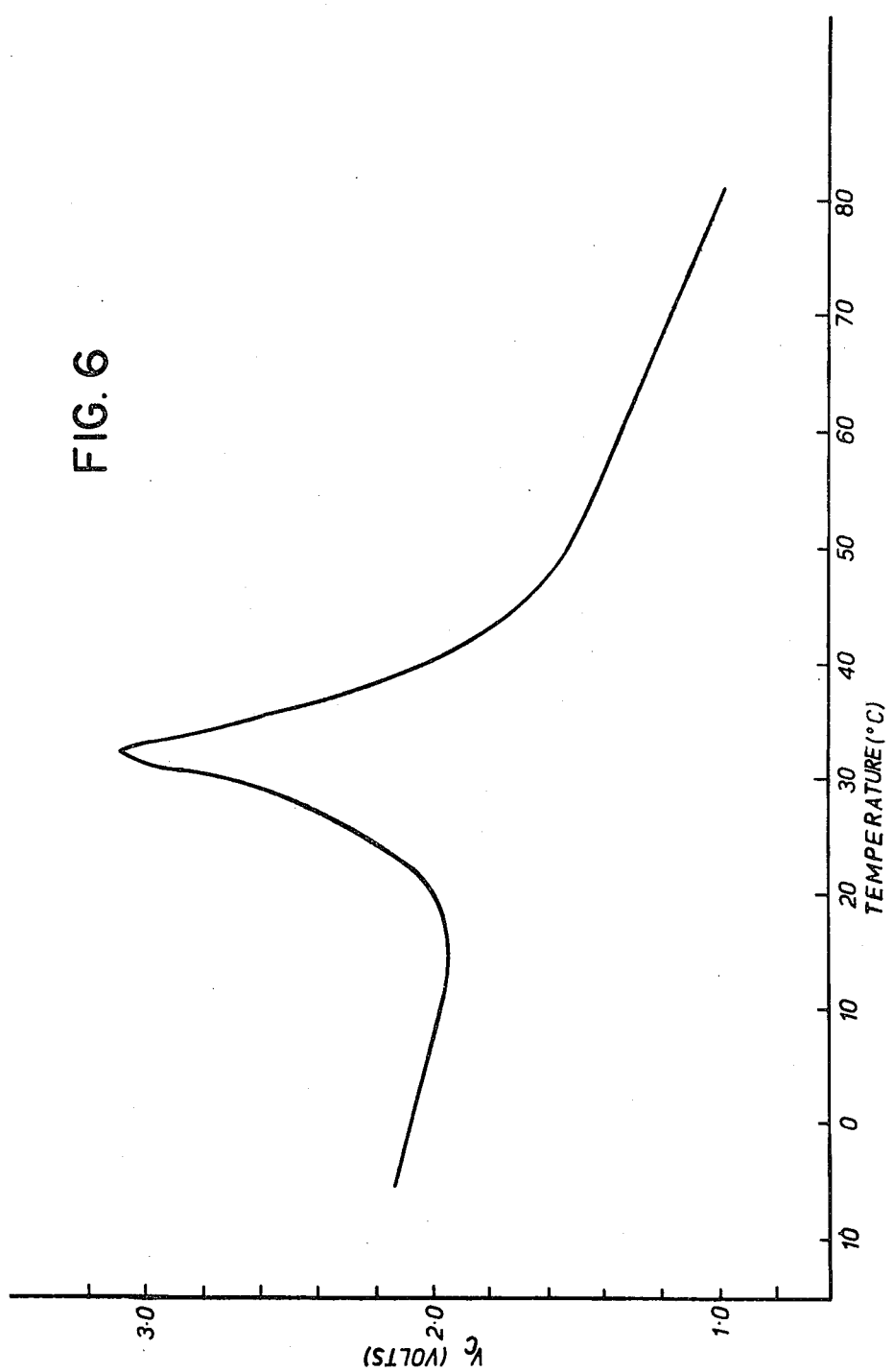
FIGS. 6 to 8 are graphs of threshold voltages vs. temperature for a range of liquid crystal mixtures having a nematic phase.
Figure 7:
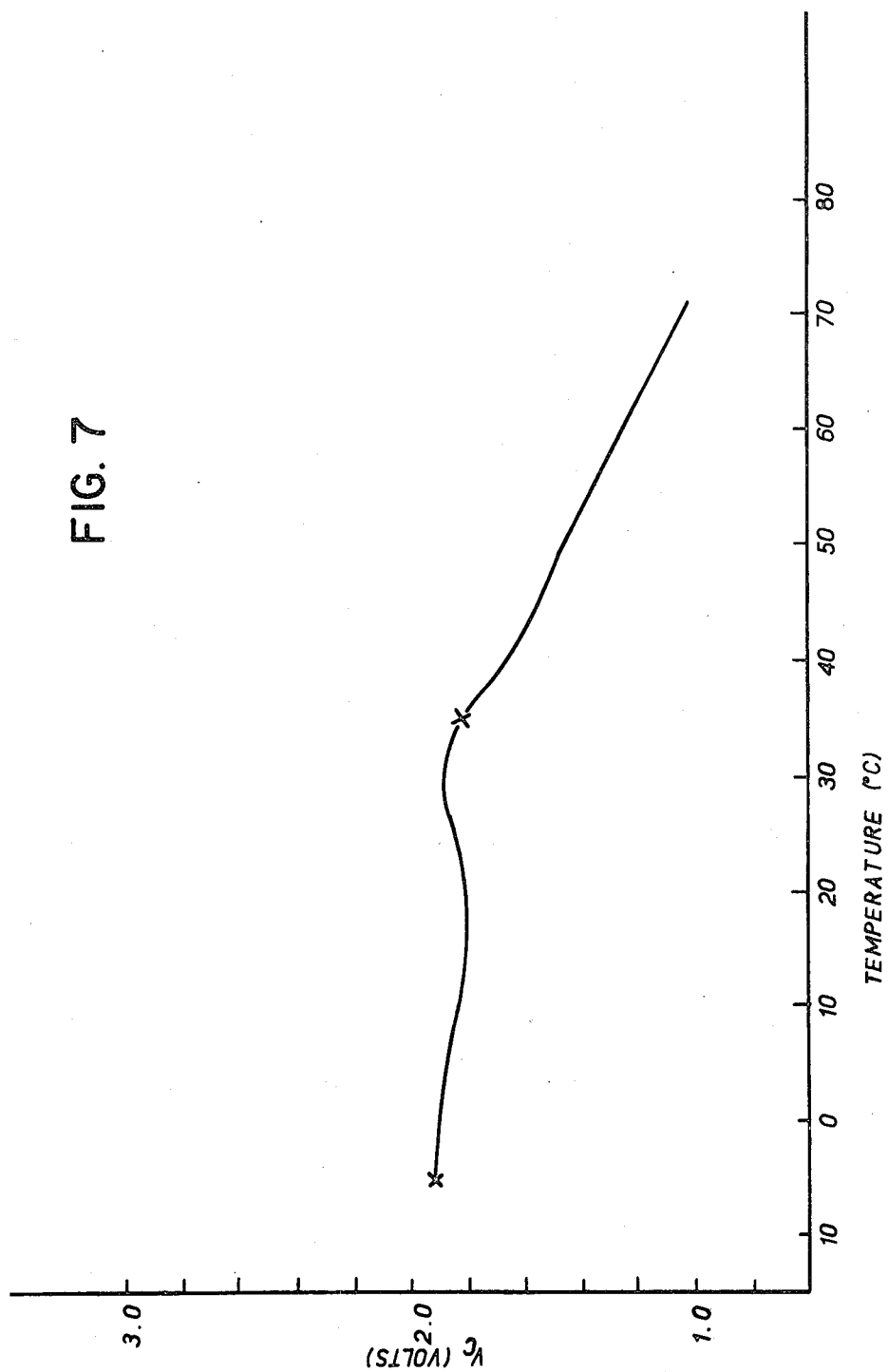
Figure 8:
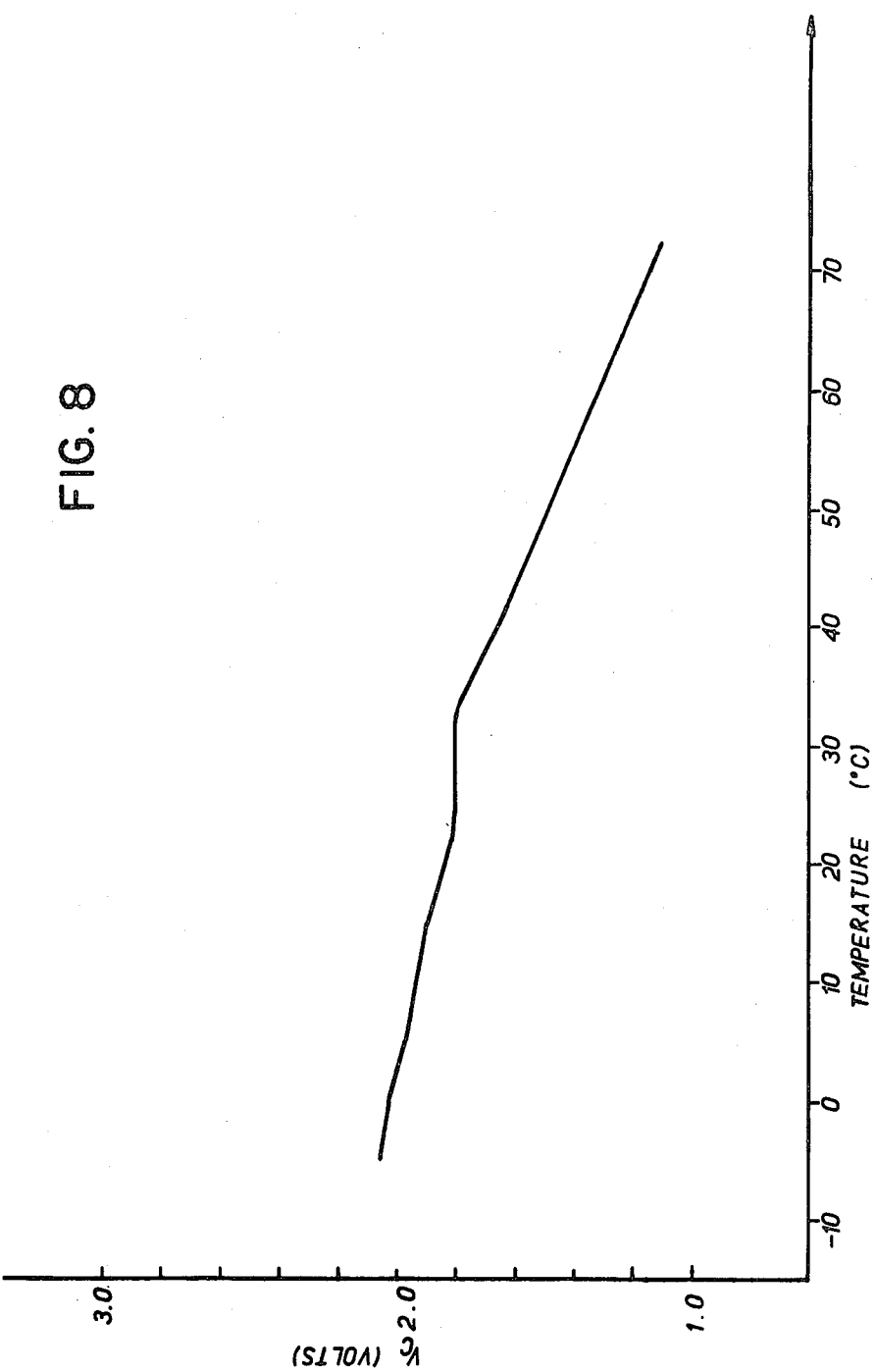

FIGS. 6, 7, 8 show the variation of $V_c$ with temperature for three different mixtures of material of types A and B. The mixture of FIG. 7 has a $\Delta V_c/V_c$ value of 0.065 volts over a temperature range $-5°$ C. to $+35°$ C. This is considerably better than a widely used E7 mixture which has a $\Delta V_c/V_c$ value of 0.32 volts over a $5°-45°$ temperature range or FIG. 4 which has a $\Delta V_c/V_c$ value of 0.24 volts.

Of the three mixtures shown in FIGS. 6, 7, 8 that of FIG. 7 has the lowest $\Delta V_c/V_c$. Increasing the proportion of a type A material changes the shape of the curve of FIG. 7 to that of FIG. 8 and increasing the amount of type A still further, e.g. FIG. 4, gives a curve of predominantly type A only. Similarly reducing the proportion of type A material changes the curve of FIG. 7 to that of FIG. 6 and eventually to that of FIG. 5. The lowest value of $\Delta V_c/V_c$ occurs between the limits of FIGS. 4 and 5.

The mixtures used were as follows:

FIG. 3 8φCB—Type C
FIG. 5 5φCB(20%), 7φCB(35%), 9φCB(35%), 5CT(10%)—Type B
FIG. 6 5φCB(22%), 7φCB(34%), 9φCB(34%), 5CT(10%)
FIG. 7 5φCB(23%), 7φCB(34%), 9φCB(33%), 5CT(10%)
FIG. 8 5φCB(24%), 7φCB(33%), 9φCB(33%), 5CT(10%)
FIG. 4 5φCB(30%), 7φCB(30%), 9φCB(30%), 5CT(10%)—Type A.

The mixture E7 (from BDH Ltd.) is
5CB(51%), 7CB(25%), 8φCB(16%), 5CT(8%).

A type A material may be multicomponent e.g. as for FIG. 4 or single component e.g. 5CB, 6CB, 7CB, 5φCB, 6φCB, 7φCB. A typical C material may be a single component material as for FIG. 3 or multicomponent mixture; other single component materials are e.g. 8CB, 9CB, 9φCB.

Examples of a type B material are as follows, the list is by no means exhaustive.

| Smectic range °C. | Component | % weight |
|---|---|---|
| −5 to 29.5 | 10CB (C$_{10}$ alkyl) | 60 |
|  | 50CB | 40 |
| 22 to 51 | 20CB | 6 |
|  | 80CB | 94 |
| 15 to 32 | 90B | 60 |
|  | 60CB | 40 |
| 1 to 35 | 50CB | 25 |
|  | 70CB | 35 |
|  | 10CB (C$_{10}$ alkyl) | 40 |
| 14 to 59 | 60CB | 30 |
|  | 80CB | 35 |
|  | 100CB | 35 |
| −12 to 41.5 | 7CB | 60 |
|  | 80CB | 20 |
|  | 100CB | 20 |
| 12 to 62 | 20CB | 10 |
|  | 80CB | 45 |
|  | 100CB | 45 |
| −3 to 57 | 9CB | 40 |
|  | 60CB | 30 |
|  | 100CB | 30 |
| 6 to 59 | 60CB | 30 |
|  | 80CB | 30 |
|  | 10CB (C$_{10}$ alkyl) = X | 30 |
|  | 5CT | 10 |
| 17 to 55 | X + 10% C$_3$H$_7$—⟨H⟩—COO—⟨O⟩—⟨O⟩—CN  |  |
| 12.5 to 64.5 | X + 10% C$_5$H$_{11}$—⟨H⟩—COO—⟨O⟩—⟨O⟩—CN  |  |
| 9 to 68 | X + 10% C$_7$H$_{15}$—⟨H⟩—COO—⟨O⟩—⟨O⟩—CN  |  |
| 25 to 48 | 9CB | 25 |
|  | 20CB | 4 |
|  | 60CB | 25 |
|  | 80CB = Y | 21 |
|  | 100CB | 15 |
|  | 5CT | 10 |
| 30.5 to 51 | Y + 10% C$_7$H$_{15}$O—⟨O⟩—C$_2$H$_4$—⟨O⟩—⟨O⟩—CN  |  |
| 30 to 50 | Y + 5% C$_6$H$_{13}$O—⟨O⟩—⟨O⟩—C$_2$H$_4$—⟨O⟩—CN  |  |
| 27.5 to 50 | Y + 5% C$_7$H$_{15}$O—⟨O⟩—C$_2$H$_4$—⟨O⟩—⟨O⟩—CN  |  |
| 23.5 to 53.5 | Y + 5% C$_7$H$_{15}$—⟨H⟩—COO—⟨O⟩—⟨O⟩—CN  |  |

-continued

| Smectic range °C. | Component | % weight |
|---|---|---|
| 21.5 to 52 | Y + 5% C$_4$H$_9$—(H)—CH$_2$O—(O)—(O)—CN | |
| 22 to 57 | Y + 5% C$_8$H$_{17}$O—(O)—(O)—COO—(O)(O)—CN | |
| 32.5 to 44.5 | Y + 5% C$_8$H$_{17}$O—(O)—COO—(O)—(O)—CN (ME substituent) | |
| 22 to 55 | Y + 5% C$_7$H$_{15}$O—(O)—(O)—COO—(O)—(O)—CN | |
| 26 to 52.5 | Y + 5% C$_7$H$_{15}$O—(O)—COO—(O)—(O)—CN | |
| 34.5 to 38.5 | Y + 5% C$_5$H$_{11}$—(O)—COO—(O)—COO—(O)—C$_5$H$_{11}$ (Cl substituent) | |
| 27.5 to 51.5 | Y + 5% C$_7$H$_{15}$—(O)—COO—(O)—(O)—CN | |
| 24 to 53.5 | Y + 5% C$_7$H$_{15}$—(O)—(O)—COO—(O)—CN | |
| 21 to 57 | Y + 5% C$_7$H$_{15}$O—(O)—(O)—COO—(O)—CN | |
| 31.5 to 58 | Y + 15% C$_7$H$_{15}$—(O)—COO—(O)—(O)—CN | |

The following mixtures plus a small extra amount of 10φCB showed a type B characteristic:

| | | |
|---|---|---|
| 36 to 46 | Y + 15% C$_3$H$_7$—(H)—COO—(O)—(O)—CN | |
| 23 to 48 | Y + 5% C$_5$H$_{11}$—(H)—COO—(O)—C$_7$H$_{15}$ | |
| 29.5 to 48.5 | Y + 5% C$_5$H$_{11}$O—(O)(O)—COO—(O)(O)—CN | |
| 30.5 to 45.5 | Y + 5% C$_5$H$_{11}$—(H)—COO—(O)(O)—CN | |
| 24 to 48 | Y + 10% C$_5$H$_{11}$—(H)—COO—(O)—C$_7$H$_{15}$ | |

The convention adopted for the materials listed above is as follows:

nCB is C$_n$H$_{2n+1}$—(O)—(O)—CN nφCB is C$_n$H$_{2n+1}$O—(O)—(O)—CN n being an integer.

For example

1φCB is CH$_3$O—(O)—(O)—CN

9CB is C$_9$H$_{19}$—(O)—(O)—CN

5φCB is C$_5$H$_{11}$O—(O)—(O)—CN

10CB is C$_{10}$H$_{21}$—(O)—(O)—CN

10φCB is C$_{10}$H$_{21}$O—(O)—(O)—CN etc.

5CT is 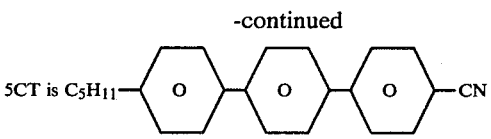

In general a single component biphenyl liquid crystal material will be type A if n≦7, type C if n>7 and in a mixture if there are components where n≦7 and n>7 then a type A, B, or C may occur depending on the relative proportions and components.

As previously noted one indication of a liquid crystal variation with temperature is $\Delta V_c/V_c$. Another value which indicates the degree of merit of a material is the ratio of $V_{sat}$ and $V_c$, where as already noted $V_{sat}$ is the voltage to give 90% or 10% of the maximum possible transmission observed at normal incidence and $V_{th}$ is the minimum voltage before the first observable molecular change when viewed at almost grazing incidence in the most favourable quadrant.

Merit figures may be defined as follows:

$$M_{20° C.} = \frac{V_{sat} \text{ (at 20° C.)}}{V_{th} \text{ (at 20° C.)}}$$

$$M_{0-40° C.} = \frac{V_{sat} \text{ (at 0° C.)}}{V_{th} \text{ (at 40° C.)}}$$

for cases of maximum and minimum values in $V_{sat}$ and $V_{th}$ then $$M_{0-40° C.} = \frac{V_{sat} \text{ (max)}}{V_{th} \text{ (min)}} \text{ over temperature range 0° to 40° C.}$$

Examples of merit

| Mixture | $\Delta V_c/V_c$ | $M_{20° C.}$ | $M_{0°-40° C.}$ |
|---------|------------------|--------------|-----------------|
| E7 | 0.32 | 2.0 | 2.75 |
| i | 0.28 | 1.76 | 2.28 |
| ii | 0.08 (over −5° to 35° C.) | 1.80 | 2.06 |
| iii | 0.10 (0° to 40° C.) | 1.86 | 2.06 |
| iv | 0.11 (0° to 40° C.) | 1.83 | 2.10 |

The mixtures were as follows:

```
i   70B(40%) 10φCB(15%) 3φCB(15%) 8φCB(20%) 5CT(10%)
ii  5φCB(23%) 7φCB(34%) 9φCB(33%) 5CT(10%)
iii 12CB(20%) 2φCB(7%) 6φCB(25%) 8φCB(25%) 10φCB(13%) 5CT(10%)
iv  10CB(25%) 2φCB(7%) 6φCB(26%) 8φCB(20%) 10φCB(12%) 5CT(10%)
``` i   E7 a standard biphenyl mixture
    A biphenyl mixture optimised for $\frac{V_{sat}}{V_{th}}$ but not $\left(\frac{\Delta V_c}{V_C}\right)$.

ii, iii } Biphenyl mixture with low $\Delta V_c/V_c$.

The liquid crystal cyano-biphenyls e.g. 5φCB, may be prepared as described in U.K. Pat. No. 1,433,130. Small amounts e.g. up to 1% of a cyano biphenyl cholesteric material or 0.2% cholesteryl nonanoate may be added to the nematic mixture to induce a preferential twist to the molecules as described in U.K. Pat. Nos. 1,472,247 & 1,478,592. The resulting mixture is then cholesteric and the pitch is arranged to be equal or greater than twice the layer thickness.

A liquid crystal display may also operate using the known phase change effect whereby a cholesteric light scattering layer becomes a nematic light transmissive layer on application of a voltage above a threshold value. The display is constructed as shown in FIGS. 1, 2 but without surface alignment. The value of $V_c$ varies with the pitch of the cholesteric material, adding nematic material increases the pitch and lowers $V_c$.

Cholesteric materials may be of type A, B, or C and have $V_c$ vs. temperature characteristics shown in FIGS. 4, 5, 3 respectively. By mixing the three types of cholesteric material more constant value of $V_c$ with temperature may be obtained.

Figure 9:
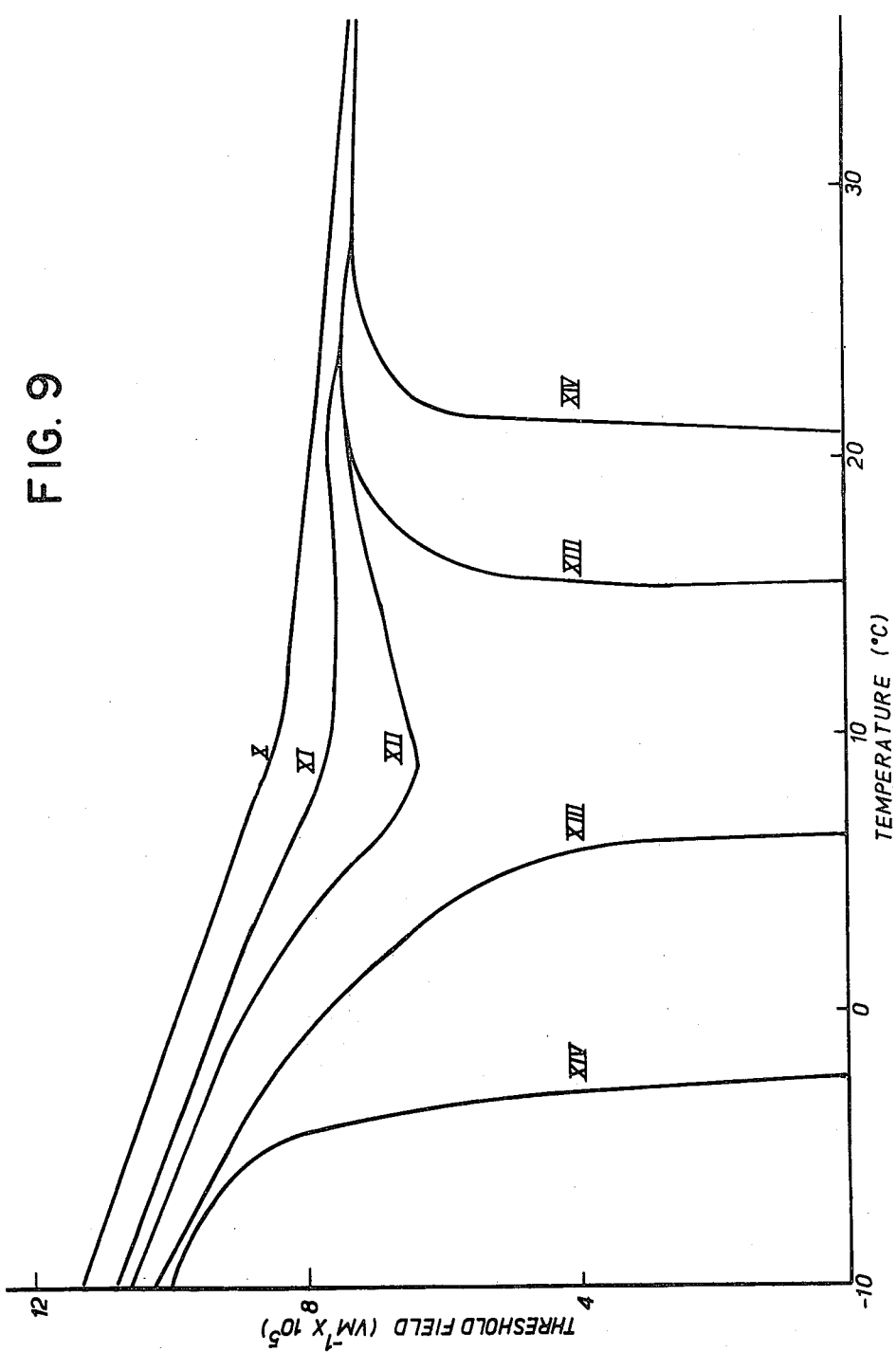
FIG. 9 is a graph of threshold voltage vs. temperature for a range of liquid crystal materials having a cholesteric phase.

This is shown in FIG. 9 which plots the variation of $V_c$ electric field with temperature for a number of cholesteric type A, cholesteric type B, and mixtures of the two types.

The materials were as follows:

| Mixture | weight % | | | |
|---------|----------|------|------|-------|
|         | 7CB | 80CB | 5CT | CB 15 |
| x | 75.05 | 11.4 | 8.55 | 5 |
| xi | 72.2 | 14.25 | 8.55 | 5 |
| xii | 69.35 | 17.1 | 8.55 | 5 |
| xiii | 68.4 | 18.05 | 8.55 | 5 |
| xiv | 64.6 | 21.85 | 8.55 | 5 |

CB 15 is 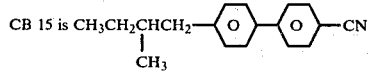

What I claim is:

1. A mixture of liquid crystal materials for use in liquid crystal displays comprising at least one material of type A and at least one material of type B selected so that the resultant mixture has only one liquid crystal phase between crystal and isotropic states and has the value $\Delta Vc/Vc$ less than 0.2 over a temperature range of 40° C., wherein
   type A has the following phases with increasing temperature
   crystal    working phase    isotropic,
   type B has the following phases with increasing temperature
   crystal    working phase    smectic    working phase    isotropic,
   and the working phase is nematic or cholesteric.

2. The liquid crystal material according to claim 1 wherein the working phase is nematic.

3. The liquid crystal material according to claim 1 wherein the working phase is cholesteric.

4. The material according to claim 2 wherein the type A material is at least one biphenyl liquid crystal material having the general formula formula 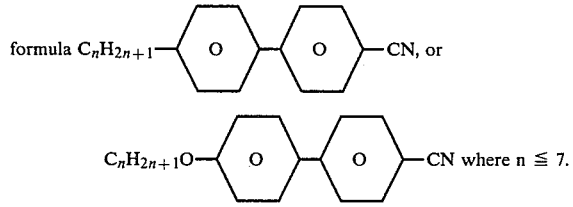

5. The material according to claim 2 wherein type B material is a mixture of type A material and a type C material which has the following phases with increasing temperature crystal smectic working phase isotropic.

6. The material according to claim 5 wherein type C material is a

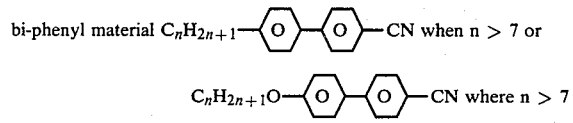

7. The material according to claim 2 wherein an amount of cholesteric material less than 1% by weight of the total material is added to the liquid crystal material.

8. The material according to claim 5 wherein the type B material is material selected from at least one mixture in the following group:

10CB(60%) 5φCB(40%)
2φCB(6%) 8φCB(94%)
9CB(60%) 6φCB(40%)
5φCB(25%) 7φCB(35%) 10CB(40%)
6φCB(30%) 8φCB(35%) 10φCB(35%)
7CB(60%)8φCB(20%) 10φCB(20%)
2φCB(10%) 8φCB(15%) 10φCB(45%)
9CB(40%) 6φCB(30%) 10φCB(30%)
6φCB(30%) 8φCB(30%) 10CB(30%) 5CT(10%) = X

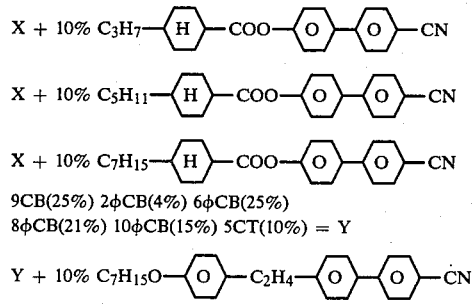

9CB(25%) 2φCB(4%) 6φCB(25%)
8φCB(21%) 10φCB(15%) 5CT(10%) = Y

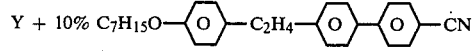

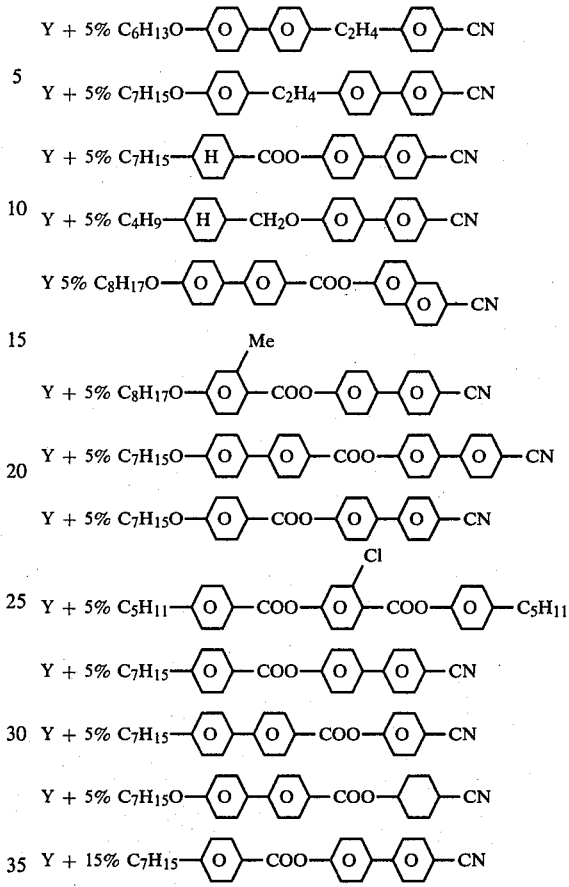

where percentages are weight percentages.

9. The material according to claim 1 wherein the value of $\Delta V_c/V_c$ is less than 0.2 over a temperature range of 0° to 40° C.

10. A liquid crystal display device comprising a layer of liquid crystal material as claimed in claim 1 contained between substrates, at least one of which is transparent, and electrode structures on the inner faces of the substrate for applying an electric field across the layer to cause an observable display effect.

11. The mixture according to claim 1 selected from the groups of mixtures consisting of
5φCB(23%) 7φCB(34%) 9φCB(33%) 5CT(10%)
12CB(20%) 2φCB(7%) 6φCB(25%) 8φCB(25%) 10φCB(13%) 5CT(10%)
10CB(25%) 2φCB(7%) 6φCB(26%) 8φCB(20%) 10φCB(12%) 5CT(10%)
where percentages are weight percentages.

* * * * *